(12) United States Patent
Sagy

(10) Patent No.: US 7,697,423 B2
(45) Date of Patent: Apr. 13, 2010

(54) PREVENTION OF PROTOCOL IMITATION IN PEER-TO-PEER SYSTEMS

(75) Inventor: Ravid Sagy, Zichron Yaacov (IL)

(73) Assignee: Cisco Technology, Inc., San Jose, CA (US)

( * ) Notice: Subject to any disclaimer, the term of this patent is extended or adjusted under 35 U.S.C. 154(b) by 735 days.

(21) Appl. No.: 11/497,683

(22) Filed: Aug. 1, 2006

(65) Prior Publication Data

US 2008/0031148 A1  Feb. 7, 2008

(51) Int. Cl.
*H04J 1/16* (2006.01)
*H04L 12/56* (2006.01)

(52) U.S. Cl. .................................. 370/229; 370/252

(58) Field of Classification Search .................. 455/405, 455/414.1, 414.3, 432.3, 433, 435.1; 379/114.29, 379/127.01, 201.01, 201.02; 725/95, 96, 725/97, 98; 709/229, 219; 370/395.64, 395.65, 370/395.4, 395.41, 395.42, 395.43, 252, 370/468, 329, 486, 229

See application file for complete search history.

(56) References Cited

U.S. PATENT DOCUMENTS

| | | | |
|---|---|---|---|
| 5,339,332 A | 8/1994 | Kammerl | |
| 5,625,622 A | 4/1997 | Johri | |
| 6,118,791 A | 9/2000 | Fichou et al. | |
| 6,167,027 A | 12/2000 | Aubert et al. | |
| 6,247,061 B1 | 6/2001 | Douceur et al. | |
| 6,286,052 B1 | 9/2001 | McCloghrie et al. | |
| 6,349,088 B1 | 2/2002 | Ginzboorg et al. | |
| 6,831,893 B1* | 12/2004 | Ben Nun et al. | ............. 370/235 |
| 7,042,886 B2 | 5/2006 | Ben Nun | |
| 7,254,632 B2* | 8/2007 | Zeira et al. | ................... 709/224 |
| 7,430,187 B2* | 9/2008 | Holt et al. | .................... 370/329 |
| 2003/0145093 A1* | 7/2003 | Oren et al. | ................... 709/229 |
| 2003/0204584 A1 | 10/2003 | Zeira et al. | |
| 2005/0152374 A1 | 7/2005 | Cohen et al. | |

OTHER PUBLICATIONS

Shreedhar and Varghese, "Efficient fair queuing using deficit round robin", Proceedings of the Conference on Applications, Technologies, Architectures, and Protocols for Computer Communication, Aug. 28-Sep. 1, 1995, Cambridge, Massachusetts, pp. 231-242.
http://www.kazaa.com.
http://www.gnutella.com.

* cited by examiner

*Primary Examiner*—Derrick W Ferris
*Assistant Examiner*—Maharishi Khirodhar
(74) *Attorney, Agent, or Firm*—Abelman, Frayne & Schwab

(57) ABSTRACT

A method for allocating a resource in a computer network includes accepting from a peer a request to download a data item using a P2P protocol via the computer network from one or more other peers that store the data item, and determining whether the P2P protocol used by the request is a preferred P2P protocol. When the P2P protocol is determined to be the preferred P2P protocol, up to a maximum data quota derived from a size of the data item is allowed to be downloaded using a first allocation level of the resource. When the P2P protocol is determined not to be the preferred P2P protocol, only a second allocation level, smaller than the first allocation level, is allowed to be used for downloading the data item.

30 Claims, 2 Drawing Sheets

PREVENTION OF PROTOCOL IMITATION IN PEER-TO-PEER SYSTEMS

FIELD OF THE INVENTION

The present invention relates generally to computer networks, and particularly to methods and systems for preventing unauthorized protocol imitation in peer-to-peer (P2P) communication systems.

BACKGROUND OF THE INVENTION

Many communication applications use peer-to-peer (P2P) protocols. Exemplary applications include file sharing systems such as the Kazaa and Gnutella systems. Information regarding these systems can be found at www.kazaa.com and wwwgnutella.com, respectively.

Some P2P protocols are proprietary protocols, often defined and operated by content providers. For example, Arvato AG (Gütersloh, Germany) developed a proprietary P2P protocol called GNAB, which is used by Bertelsmann AG (Gütersloh, Germany) for legally distributing media content.

The present invention will be more fully understood from the following detailed description of the embodiments thereof, taken together with the drawings in which:

DETAILED DESCRIPTION OF EMBODIMENTS

Overview

In some computer networks it is sometimes desirable to differentiate the service level provided to different peer-to-peer (P2P) protocols. For example, a network operator may wish to limit the network bandwidth provided to traffic that uses publicly-known P2P protocols. Certain preferred protocols, such as proprietary protocols deployed by content providers, may be provided with high bandwidth. However, such differentiation is likely to be subject to protocol imitation fraud. In other words, unauthorized users may attempt to imitate a preferred protocol in order to gain higher bandwidth or other resources.

Embodiments of the present invention provide methods and systems for preventing protocol imitation in peer-to-peer (P2P) applications. One or more P2P protocols are predefined as preferred protocols. Each P2P download transaction that uses a preferred protocol is assigned a temporary authorization code. Additionally, each such transaction is allowed to download data at high bandwidth only up to a maximum data quota, which depends on the size of the data item requested for download.

As a result, imitating a preferred P2P protocol by recording and replaying a legitimate transaction or by reverse-engineering the software code of the protocol is rendered ineffective. In some embodiments, additional counter-imitation measures are taken, such as performing coordinated changes in certain packet parameters.

System Description

Figure 1:
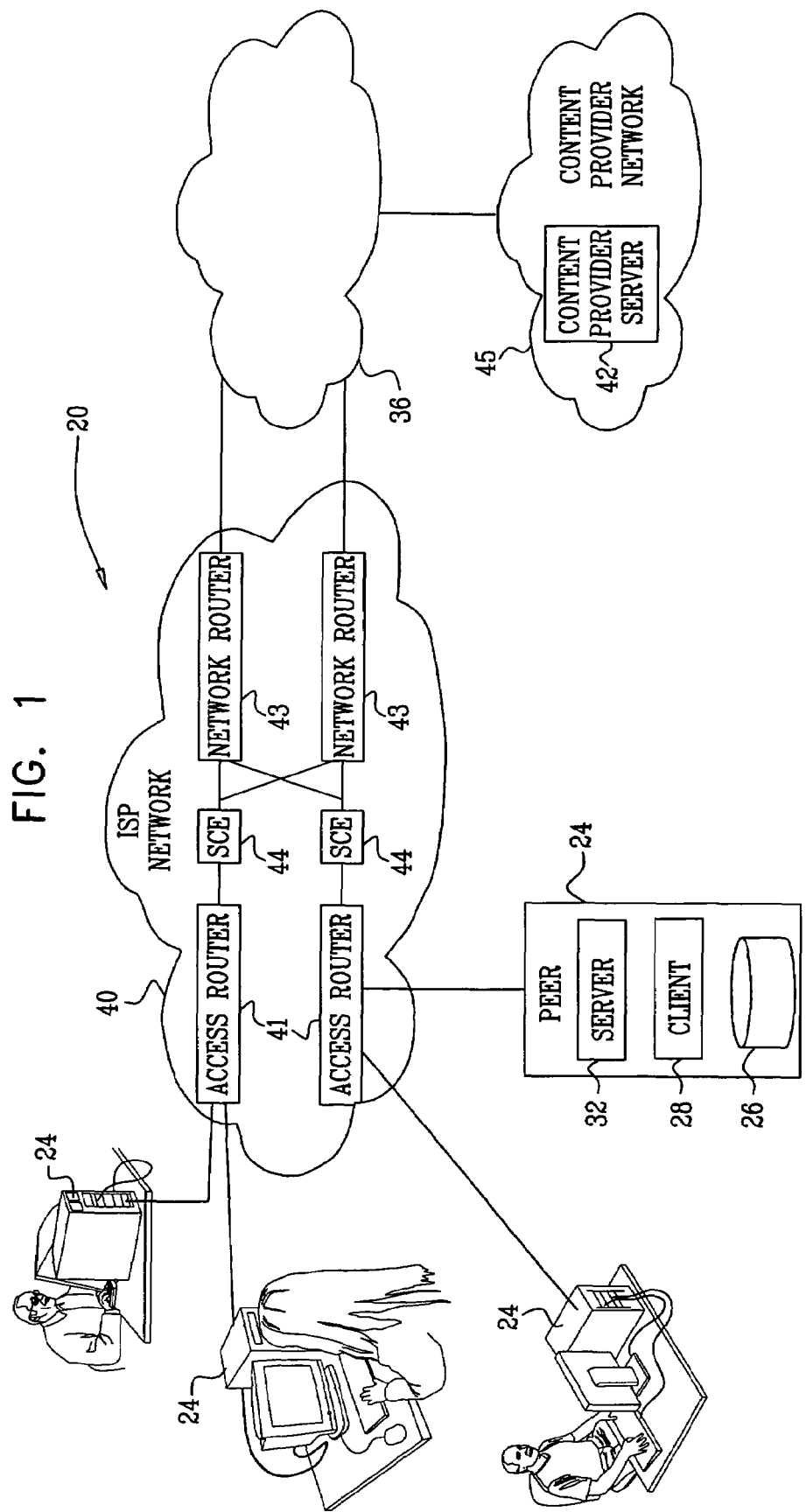
FIG. 1 is a block diagram that schematically illustrates a computer network, in accordance with an embodiment of the present invention.

FIG. 1 is a block diagram that schematically illustrates a computer network 20, in accordance with an embodiment of the present invention. Network 20 comprises multiple peers 24, which share data items with one another using P2P protocols. Peers 24 may comprise personal computers or any other suitable workstation or terminal. Typically, each peer 24 comprises a memory, such as a database 26, in which data items are locally stored. The peers may store and share any suitable data item, usually in the form of computer-readable files. Data items may comprise, for example, image files, music files, multimedia files, data files or any other suitable data item.

Peers 24 are connected to the Internet (denoted 36) via Internet service providers (ISP). Each ISP operates an ISP network 40, which connects the peers registered with the ISP to the Internet. Each ISP network 40 may comprise access ports, network elements such as routers, and authentication, authorization and accounting (AAA) servers, as is known in the art. ISP network 40 typically comprises an Internet protocol (IP) network. In the exemplary network configuration of FIG. 1, peers 24 connect to ISP network 40 via access routers 41, and access to the Internet is performed by network routers 43.

Each peer 24 comprises a client 28 and a server 32 of the P2P application used by the peer. Generally, client 28 of a particular peer communicates with one or more servers 32 of other peers in order to download data items stored in their respective databases 26. In some P2P protocols data items are divided into fragments. A client 28 may communicate with multiple servers 32 and download different fragments of a requested data item from different peers.

The peers in network 20 may use different P2P protocols. Some of these protocols may comprise publicly available protocols such as Kazaa and Gnutella. Other P2P protocols may comprise proprietary protocols defined and operated by content providers, which typically charge a certain price for downloading data items. The GNAB protocol cited above is an exemplary proprietary protocol.

When using a proprietary P2P protocol operated by a content provider, peers first interact with a content server 42, which is operated by the content provider that also deploys the proprietary P2P protocol. The content server performs functions such as authenticating the peers, performing financial transactions with peers for purchasing data items, and informing peers as to the identities of other peers that locally store requested data items. In some embodiments, the content server may be part of a content provider network 45, which comprises additional network elements related to the operation of the content provider.

In some cases, it is beneficial for content providers as well as for ISPs to differentiate between the service levels given to different protocols, and in particular P2P protocols. Specifically, it is often technically and financially beneficial for an ISP to limit the network bandwidth provided to traffic that uses publicly-known protocols, and to dedicate more bandwidth to certain proprietary protocols, such as voice over IP (VoIP) and video protocols.

As will be shown below, the methods and systems described herein enable one or more P2P protocols to be defined as preferred protocols. P2P transactions that use the preferred protocols are allocated a high network bandwidth, while transactions of other P2P protocols are allowed only limited bandwidth. Although the embodiments described herein refer to bandwidth allocation, the methods and systems described herein can be used to control the allocation of other network resources, such as queuing priority, memory or computation resources in network elements.

Network 20 comprises one or more service control engines 44, which carry out the differential bandwidth allocation described herein. In FIG. 1, the service control engines are located between access routers 41 and network routers 43, although other configurations are possible. The structure and functionality of SCE 44 is described in detail hereinbelow.

Figure 2:
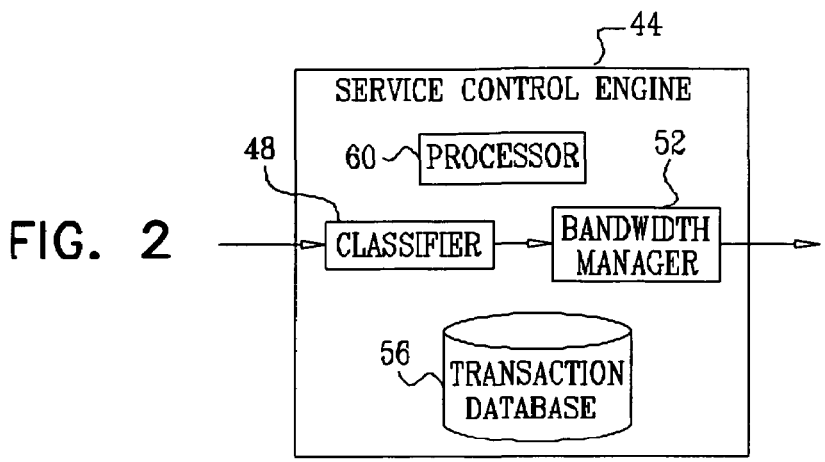
FIG. 2 is a block diagram that schematically illustrates a service control engine (SCE), in accordance with an embodiment of the present invention.

FIG. 2 is a block diagram that schematically illustrates SCE 44, in accordance with an embodiment of the present invention. SCE 44 comprises a classifier 48, which classifies data packets passing between ISP network 40 and the Internet. In general, SCE 44 monitors both upstream and downstream packets. In some cases, as can be seen in FIG. 1 above, P2P traffic may flow between two peers connected to the same access router in the ISP network. Other configurations may exist, in which the traffic between two peers does not normally pass through the SCE. In order to carry out the methods described herein, the ISP network should be configured so that such traffic is routed through one of the SCEs. For example, access routers 41 can be configured to route all traffic to network routers 43, regardless of the source and destination of the traffic.

Based on the classification performed by classifier 48, a bandwidth manager 52 allocates the appropriate bandwidth to packet flows associated with different P2P protocols. SCE 44 further comprises a transaction database 56, which holds records related to P2P transactions, as will be described below. The classifier and bandwidth manager are typically implemented in hardware or firmware, such as in application specific integrated circuits (ASIC) or field programmable gate arrays (FPGA).

A processor 60 controls the operation of the classifier, bandwidth manager and database, and may carry out some or all of the methods described herein. Typically, processor 60 comprises a general-purpose computer, which is programmed in software to carry out the functions described herein. The software may be downloaded to the computer in electronic form, over a network, for example, or it may alternatively be supplied to the computer on tangible media, such as CD-ROM.

Prevention of Protocol Imitation

The allocation of improved network resources to a particular protocol may be subject to imitation fraud. In other words, an unauthorized user may try to imitate the preferred P2P protocol in order to gain improved bandwidth or other network resources. In some P2P protocols, a peer that allows another peer to download data from its local database is credited with bonus points that can be used in future data purchases. An unauthorized user may attempt to imitate the protocol in order to gain such bonus points. The methods and systems described herein comprise measures for preventing an unauthorized user from imitating the preferred P2P protocol.

In some embodiments, the methods and systems described herein can also be used to authenticate bonus-rewarding transactions. For example, the content provider can be notified of legitimate download transactions between peers. The notification may comprise the time of the transaction, the amount of data involved and the identities of the peers.

In a typical transaction that uses a preferred P2P protocol, a peer requests to download a desired data item by sending a download request to content server 42. Server 42 holds a database of available data items along with the identities of peers 24 that locally store these items. The server also stores the size, typically in bytes, of each data item. The requesting peer registers with server 42, which often authenticates the peer's identity.

The peer performs a purchasing transaction with the server in order to purchase the requested data item. In return, the server sends the requesting peer a list of other peers in network 20 that locally store the requested item. The server also returns an authorization code, using which the requesting peer can access the other peers indicated by the server for downloading the data item in question. (In some embodiments, the peer may also download the data item from the content server itself.) Additionally, server 42 indicates to the peer the size of the requested data item, typically expressed in bytes. In general, the requesting peer and the peers storing the requested data item may be registered with a particular ISP or belong to different ISPs and ISP networks.

SCE 44 monitors the download request and the transaction held between the requesting peer and the content server. In particular, SCE 44 extracts the identity of the peer, the IP address used by the peer, the authorization code and the size of the requested data item from the monitored transaction. Note that server 42 is regarded as a trusted source, i.e., a source whose IP addresses cannot be stolen or otherwise fraudulently used. SCE 44 creates a new record associated with the transaction in transaction database 56. The record comprises the identity of the subscriber, the authorization code and the size of the requested data item, as extracted from the transaction between the peer and the content server. Note that the IP address used by the peer may change from time to time. The SCE associates between the currently-used IP address and the subscriber identity.

The size of the requested data item is regarded as a maximum data quota for which download is allowed at high bandwidth, in the particular P2P transaction. When the requesting peer begins to download the requested data item, the SCE monitors the data packets associated with the transaction. For each approved transaction, the SCE maintains a virtual bucket, i.e., a variable that tracks the amount of data associated with the transaction that was already downloaded. The bucket is initially set to the size of the data item, as indicated to the peer by the content server.

As the download progresses, the SCE tracks the amount of data being downloaded and decreases the variable value (i.e., empties the bucket) accordingly. As long as the bucket is not empty, bandwidth manager 52 of SCE 44 allocates a high bandwidth to the packets associated with the transaction.

When the bucket is empty, i.e., when the amount of downloaded data reaches the size of the requested data item, the SCE regards the transaction as expired. The SCE deletes the corresponding record from database 56. As a result, the authorization code assigned to the transaction is no longer valid, and subsequent download attempts associated with the particular transaction will be allocated only limited bandwidth. In some embodiments, download attempts associated with an expired transaction can be denied, reported, or otherwise treated as fraud attempts.

In alternative embodiments, the maximum data quota is calculated based on, but not necessarily equal to, the size of the data item. For example, a certain safety margin may be applied, so that the maximum data quota is slightly larger than the size of the data item.

The method described above effectively prevents an unauthorized user from imitating the preferred P2P protocol. High bandwidth is provided only to download attempts that use the preferred P2P protocol, carry the correct authorization code and originate from the correct IP address. Furthermore, high bandwidth is provided to a limited amount of data, based on the size of the requested data item. Thus, in order to gain high bandwidth, an unauthorized user should be able to imitate the IP address of the requesting peer, to acquire the authorization code of the particular transaction, and to perform the download before the genuine requesting peer does so. Even if all these conditions are met, high bandwidth download is limited to a finite amount of data before the transaction expires.

Imitation fraud is most commonly attempted either by recording and replaying a legitimate packet sequence, or by reverse-engineering the software code of the protocol. It can be appreciated that the combination of peer identification, authorization code and limited data quota is effective against both methods, as well as against other imitation fraud techniques.

Figure 3:
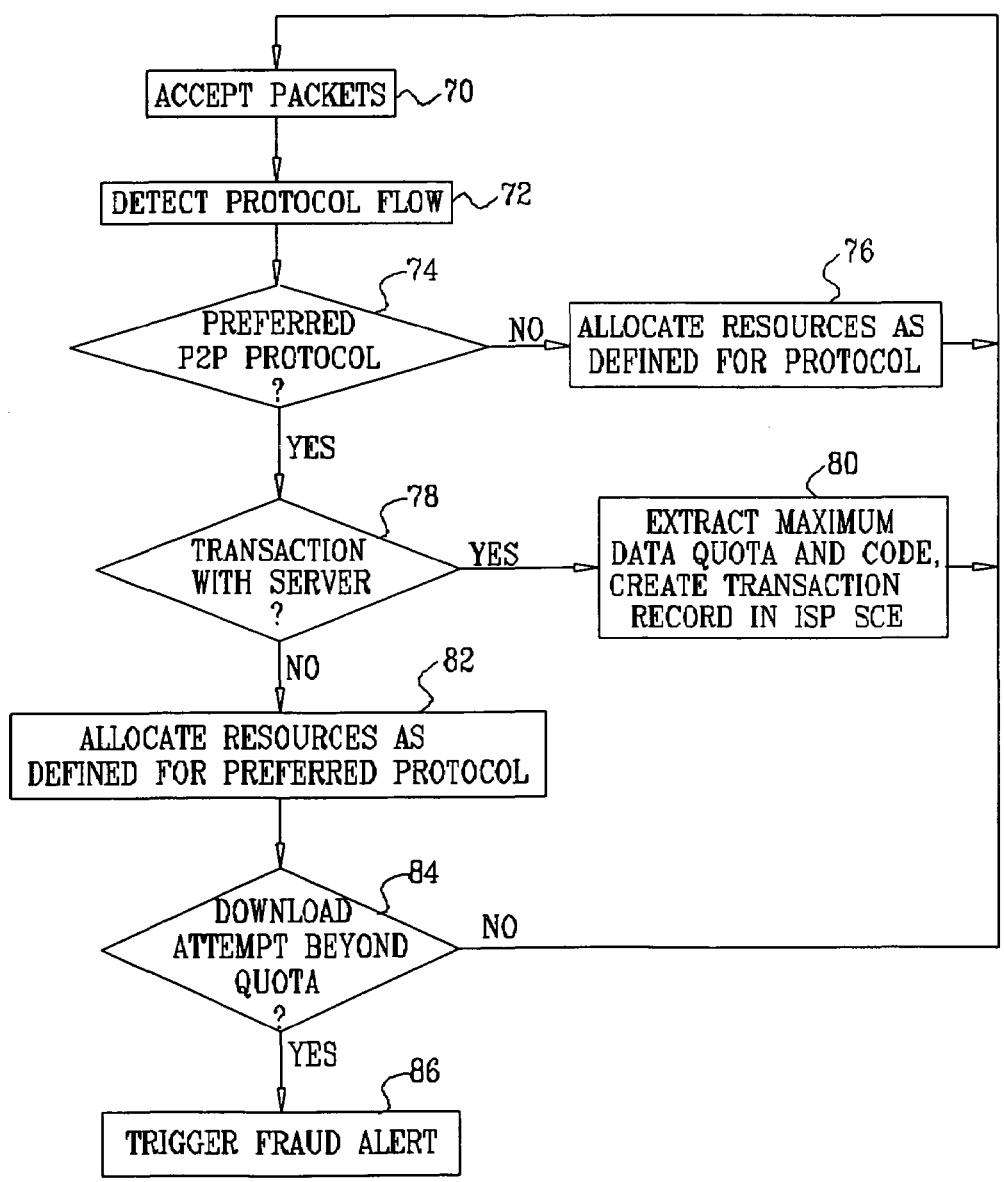
FIG. 3 is a flow chart that schematically illustrates a method for controlling network bandwidth allocated to peer-to-peer transactions, in accordance with an embodiment of the present invention.

FIG. 3 is a flow chart that schematically illustrates a method for controlling network bandwidth allocated to peer-to-peer transactions, in accordance with an embodiment of the present invention. The method begins with SCE 44 accepting data packets, at a packet accepting step 70. The SCE identifies the protocol used by the packets, at a protocol identification step 72. Typically, classifier 48 of SCE 44 analyzes tuples or other header fields of the data packets in order to identify the protocol.

Methods for classifying packet flows which can be used for this purpose are described, for example, in U.S. Pat. Nos. 6,831,893 and 7,042,886, whose disclosures are incorporated herein by reference. In some embodiments, the SCE may detect known data patterns associated with specific protocols in the data packets. Detecting the data patterns may use methods based on regular expressions. Exemplary classification methods that use regular expressions are described, for example, in U.S. Patent Application Publication 2003/0204584 A1, whose disclosure is incorporated herein by reference.

The SCE checks whether the identified protocol comprises a preferred P2P protocol, at a preferred protocol checking step 74. If the protocol does not comprise a preferred P2P protocol, bandwidth manager 52 allocates bandwidth to the packets, as defined for the particular protocol, at a non-preferred allocation step 76. In some embodiments, such as when the protocol comprises a public, non-preferred P2P protocol, the SCE limits the bandwidth allocated to the flow.

Otherwise, the classifier determines that the identified protocol comprises a preferred protocol. The classifier checks whether the flow comprises a transaction with content server 42, at a server interaction checking step 78. If the flow comprises a transaction with the server, i.e., a download request from a peer, a P2P transaction is initiated, at a P2P initialization step 80. As described above, server 42 performs a purchasing transaction with the requesting terminal and SCE 44 extracts the peer identity, the authorization code and the size of the requested data item from this transaction. The SCE crates a new record for the transaction in database 56. In particular, the SCE initializes a virtual bucket set to the size of the data item. The method then loops back to accept subsequent data packets.

If, as checked at step 78 above, the identified flow does not comprise a transaction with the content server, classifier 48 concludes that the identified flow comprises a download attempt. Bandwidth manager 48 allocates bandwidth to the flow, as defined for the preferred protocol, at a preferred download step 82. Typically, the bandwidth manager allows download at a high data rate. The bandwidth manager first verifies that the download attempt corresponds to a valid P2P transaction by comparing the authorization code and IP address of the requesting peer to the corresponding values in the records of database 56.

The bandwidth manager tracks the status of the corresponding virtual bucket, and updates its value as the download progresses. The bandwidth manager continues to provide high bandwidth to the transaction as long as the bucket in not empty. When the bucket empties, the SCE deletes the corresponding record from database 56.

From this point, any subsequent download attempt that associated with the transaction is regarded as a fraud attempt. If SCE 44 detects a subsequent download attempt that exceeds the maximum data quota, as checked by a quota overrun detection step 84, the SCE concludes that the download attempt is the result of imitation fraud. The SCE triggers a fraud alert, at an alerting step 86.

The controlling of bandwidth and/or other resources by the bandwidth manager can be implemented in several ways. For example, in some embodiments the bandwidth manager directly assigns bandwidth to the data packets passing through it. Additionally or alternatively, the bandwidth manager can indirectly affect the allocation of resources performed by other network elements. For example, the bandwidth manager can add a class-of-service (COS) indication to the packets, in order to instruct other network elements in networks 36 and/or 40 to give the appropriate priority to the packets. The SCE can also actively request an external network element to provide a preferred service level to a particular flow, which was identified to be a legitimate download attempt using a preferred P2P protocol.

In some embodiments, SCE 44 detects fraud attempts as part of the methods described above. For example, a peer attempting to download a data item that is larger than the maximum quota defined by server 42 may be interpreted as a fraud attempt. Other examples comprise attempting to use the authorization code of an expired P2P session, and a mismatch between the identity of the subscriber and the authorization code.

In some embodiments, the protection against protocol imitation is further enhanced by embedding time-varying information that cannot be re-used by an imitator in the packets of the preferred P2P protocol. The SCE monitors the P2P traffic flowing between peers and verifies that the packet parameters match the protocol definition. If the parameters do not match, the traffic is assumed to be fraudulent.

For example, in some embodiments, the peers calculate a security code based on certain packet parameters and then embed the security code in the packet. The security code is calculated in accordance with a time-varying configuration. For example, the security code may comprise the sum of one or more data bytes of the packet multiplied by respective factors, the client IP address multiplied by another factor and a timestamp multiplied by yet another factor. In some embodiments, only the eight least significant bits of the code are used as the result to avoid overflow.

In the present example, the time-varying configuration defines the different multiplicative factors that multiply the data bytes, IP address and time stamp, as well as the locations of the selected data bytes in the packet and/or the location in the packet in which the security code is to be written.

When a peer sends a packet to another peer using the preferred P2P protocol, its P2P server calculates the security code using the currently-used configuration, and writes the code in the appropriate location in the packet. The P2P client of the other peer ignores the location holding the security code.

SCE 44 monitors the traffic flowing between the two peers. The SCE calculates the security code in accordance with the current configuration, and compares the result with the code embedded in the packet. If the result matches the embedded code, the packet is assumed legitimate. Otherwise, the packet is assumed fraudulent.

Embedding time-varying information can be performed for every packet, for a subset of the packets, or only to the first packet of the flow.

Any suitable method can be used for indicating the currently-used configuration to the peers and SCE. For example, a large set of possible configurations can be predefined and stored in the peers, SCE and content server. When the content server approves a download request of a certain peer, it sends a response comprising the authorization code and size of the requested data item. In this message, the content server may also indicate to the peer which configuration in the set should be used for the current transaction, such as by sending a serial number of the configuration in the set. When the SCE extracts the different parameters from the content server's response, it also extracts the configuration number. Using this method, the peers and SCE can be notified with the current configuration without additional traffic or management.

Although the embodiments described herein mainly address preventing the imitation of P2P protocols, the principles of the present invention can also be used for preventing fraudulent use of other communication protocols used for downloading data. Additionally, the methods and systems described herein can be used for preventing fraud and/or for providing differentiated service levels in other applications, such as video on demand (VOD), IP television (IPTV), video conferencing and voice over IP (VoIP) protocols.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for allocating a resource to perform a download of a data item of a predetermined size stored among a plurality of peers in a computer network, the method comprising:
    defining at least one preferred P2P protocol;
    accepting, from a requesting peer of the plurality of peers, a request to download the data item using a requesting peer protocol;
    obtaining from said requesting peer a peer IP address used by said requesting peer;
    providing to said requesting peer:
        the predetermined size of the data item;
        a list of other peers that store the data item; and
        a temporary authorization code to access said other peers;
    calculating a maximum data quota for the download based on the predetermined size of the data item;
    determining whether said requesting peer protocol is said at least one preferred P2P protocol;
    determining an IP address of said requesting peer;
    determining whether said temporary authorization code is currently valid;
    monitoring a subsequent download attempt; and
    if said requesting peer protocol is said at least one preferred P2P protocol, and if said IP address is said peer IP address, and if said temporary authorization code is currently valid, and if said subsequent download attempt originates from said requesting peer and carries said temporary authorization code, then allocating a preferred service level of the resource for the download up to said maximum data quota.

2. The method according to claim 1, wherein the resource comprises a bandwidth of a network element in the computer network.

3. The method according to claim 1, wherein the resource comprises a queuing priority in a network element in the computer network.

4. The method according to claim 1, wherein the resource comprises a memory space of a network element in the computer network.

5. The method according to claim 1, wherein the resource comprises a computational resource of a network element in the computer network.

6. The method according to claim 1, wherein said accepting said request to download the data item comprises performing a purchasing transaction with said requesting peer for purchasing the data item.

7. The method according to claim 1, wherein said performing said purchasing transaction comprises creating a record in a transaction database holding at least one parameter selected from a group consisting of: an identification of said requesting peer peer; said temporary authorization code; and a remaining data quota to be downloaded at said preferred service level of the resource; and wherein said allocating said preferred service level of the resource comprises updating a remaining data quota responsively to said subsequent download attempt to which said preferred service level of the resource is allocated.

8. The method according to claim 1, and comprising inserting into a download data packet of said subsequent download attempt a class of service (COS) indication instructing a network element to allocate a service level to said data packet.

9. The method according to claim 1, and comprising sending a notification to an element of the computer network to provide an enhanced service level to said subsequent download attempt.

10. The method according to claim 1, wherein monitoring said subsequent download attempt comprises analyzing data packets sent over the computer network so as to identify at least one item selected from a group consisting of: said peer IP address used by said requesting peer; and said requesting peer protocol.

11. The method according to claim 10, wherein said at least one preferred P2P protocol comprises a definition of a time-dependent parameter, wherein said monitoring said subsequent download attempt comprises analyzing a time-dependent parameter embedded in a data packet of said at least one preferred P2P protocol and authenticating said subsequent download attempt by verifying that a received time-dependent parameter matches said definition of said time-dependent parameter.

12. The method according to claim 11, wherein said received time-dependent parameter comprises a value calculated by applying a multiplicative factor to at least one data item selected from a group consisting of: data content at a predefined location in said data packet; said peer IP address used by said requesting peer; and a time stamp.

13. The method according to claim 12, wherein at least one time-varying element is selected from a group consisting of:

said multiplicative factor; said predefined location in said data packet; and a location of a value in said data packet.

14. The method according to claim 1, wherein determining whether said requesting peer protocol is said at least one preferred P2P protocol comprises identifying a data pattern typical of said at least one preferred P2P protocol in a data packet carrying said request.

15. Apparatus for allocating a resource to perform a download of a data item of a predetermined size stored among a plurality of peers in a computer network, the apparatus comprising:
   a classifier, which is arranged to accept from a requesting peer of the plurality of peers, a request to download the data item using a requesting peer protocol; and
   a processor, which is arranged to:
      define at least one preferred P2P protocol;
      obtain from said requesting peer a peer IP address used by said requesting peer;
      provide to said requesting peer:
         the predetermined size of the data item;
         a list of other peers that store the data item; and
         a temporary authorization code to access said other peers;
      calculate a maximum data quota for the download based on the predetermined size of the data item;
      determine whether said requesting peer protocol is said at least one preferred P2P protocol;
      determine an IP address of said requesting peer;
      determine whether said temporary authorization code is currently valid;
      monitor a subsequent download attempt; and
   allocate, if said requesting peer protocol is said at least one preferred P2P protocol, and
   if said IP address is said peer IP address, and if said temporary authorization code is currently valid, and if said subsequent download attempt originates from said requesting peer and carries said temporary authorization code, a preferred service level up to said maximum data quota.

16. The apparatus according to claim 15, wherein the resource comprises at a bandwidth of a network element in the computer network.

17. The apparatus according to claim 15, wherein the resource comprises a queuing priority in a network element in the computer network.

18. The apparatus according to claim 15, wherein the resource comprises a memory space of a network element in the computer network.

19. The apparatus according to claim 15, wherein the resource comprises a computational resource of a network element in the computer network.

20. The apparatus according to claim 15, wherein said classifier and said processor are arranged to monitor a subsequent download attempt, and to said preferred service level of the resource only if said subsequent download attempt originates from said requesting peer and carries said temporary authorization code, subject to said maximum data quota.

21. The apparatus according to claim 20, and comprising a transaction database, which is arranged to hold transaction records, wherein said processor is arranged to create a record in the transaction database, holding at least one parameter selected from a group consisting of: an identification of said requesting peer; said temporary authorization code; and a remaining data quota to be downloaded at said preferred service level; and to update said remaining data quota responsively to said subsequent download attempt to which said preferred service level is allocated.

22. The apparatus according to claim 20, wherein said processor is arranged to insert into a download data packet of said subsequent download attempt a class of service (COS) indication instructing a network element to allocate a service level to said data packet.

23. The apparatus according to claim 20, wherein said processor is arranged to send a notification to an element of the computer network to provide an enhanced service level to said subsequent download attempt.

24. The apparatus according to claim 20, wherein said classifier is arranged to monitor said subsequent download attempt by analyzing data packets sent over the computer network so as to identify at least one item selected from a group consisting of: said peer IP address used by said requesting peer; and said requesting peer protocol.

25. The apparatus according to claim 20, wherein said at least one preferred P2P protocol comprises a definition of a time-dependent parameter, wherein said monitoring said subsequent download attempt comprises analyzing a time-dependent parameter embedded in a data packet of said at least one preferred P2P protocol and authenticating said subsequent download attempt by verifying that a received time-dependent parameter matches said definition of said time-dependent parameter.

26. The apparatus according to claim 25, wherein said received time-dependent parameter comprises a value calculated by applying a multiplicative factor to at least one data item selected from a group consisting of: data content at a predefined location in said data packet; said peer IP address used by said requesting peer; and a time stamp.

27. The apparatus according to claim 26, wherein at least one time-varying element is selected from a group consisting of: said multiplicative factor; said predefined location in said data packet; and a location of a value in said data packet.

28. The apparatus according to claim 15, wherein said classifier is arranged to identify a data pattern typical of said at least one preferred P2P protocol in a data packet carrying said request so as to identify whether said requesting peer protocol is said at least one preferred P2P protocol.

29. A computer software product for allocating a resource to perform a download of a data item of a predetermined size stored among a plurality of peers in a computer network, the product comprising a non-transitory computer-readable medium in which program instructions are stored, which instructions, when read by the computer, cause the computer to:
   accept from a requesting peer of the plurality of peers a request to download the data item using a requesting peer protocol;
   define at least one preferred P2P protocol;
   obtain from said requesting peer a peer IP address used by said requesting peer;
   provide to said requesting peer:
      the predetermined size of the data item;
      a list of other peers that store the data item; and
      a temporary authorization code to access said other peers;
   calculate a maximum data quota for the download based on the predetermined size of the data item;
   determine whether said requesting peer protocol is said at least one preferred P2P protocol;
   determine an IP address of said requesting peer;
   determine whether said temporary authorization code is currently valid;
   monitor a subsequent download attempt; and
      allocate, if said requesting peer protocol is said at least one preferred P2P protocol, and if said IP address is said peer IP address, and if said temporary authorization code is currently valid, and if said subsequent download attempt originates from said requesting peer and carries said temporary authorization code, a preferred service level up to said maximum data quota.

30. Apparatus for allocating a resource to perform a download of a data item of a predetermined size stored among a plurality of peers in a computer network, the apparatus comprising:

means for defining at least one preferred P2P protocol;

means for accepting, from a requesting peer of the plurality of peers, a request to download the data item using a requesting peer protocol;

means for obtaining from said requesting peer a peer IP address used by said requesting peer;

means for providing to said requesting peer:
  the predetermined size of the data item;
  a list of other peers that store the data item; and
  a temporary authorization code to access said other peers;

means for calculating a maximum data quota for the download based on the predetermined size of the data item;

means for determining whether said requesting peer protocol is said at least one preferred P2P protocol;

means for determining an IP address of said requesting peer;

means for determining whether said temporary authorization code is currently valid;

means for monitoring a subsequent download attempt; and means for allocating a preferred service level of the resource for the download up to said maximum data quota, if said requesting peer protocol is said at least one preferred P2P protocol, and if said IP address is said peer IP address, and if said temporary authorization code is currently valid, and if said subsequent download attempt originates from said requesting peer and carries said temporary authorization code.

* * * * *